United States Patent
Yang et al.

(10) Patent No.: US 10,314,018 B2
(45) Date of Patent: Jun. 4, 2019

(54) METHOD FOR TRANSMITTING AND RECEIVING WIRELESS SIGNAL AND APPARATUS THEREFOR

(71) Applicant: LG ELECTRONICS INC., Seoul (KR)

(72) Inventors: Suckchel Yang, Seoul (KR); Hyukjin Chae, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/748,821

(22) PCT Filed: Aug. 12, 2016

(86) PCT No.: PCT/KR2016/008911
§ 371 (c)(1),
(2) Date: Jan. 30, 2018

(87) PCT Pub. No.: WO2017/026848
PCT Pub. Date: Feb. 16, 2017

(65) Prior Publication Data
US 2018/0227906 A1    Aug. 9, 2018

Related U.S. Application Data

(60) Provisional application No. 62/367,129, filed on Jul. 27, 2016, provisional application No. 62/203,932, filed on Aug. 12, 2015.

(51) Int. Cl.
*H04W 72/04* (2009.01)
*H04L 5/00* (2006.01)
(Continued)

(52) U.S. Cl.
CPC .......... *H04W 72/0413* (2013.01); *H04L 5/00* (2013.01); *H04L 5/0053* (2013.01);
(Continued)

(58) Field of Classification Search
None
See application file for complete search history.

(56) References Cited

U.S. PATENT DOCUMENTS

2013/0182627 A1* 7/2013 Lee ............... H04W 72/042
                                                370/311
2013/0195066 A1* 8/2013 Lee ................. H04W 52/04
                                                370/329

(Continued)

OTHER PUBLICATIONS

Huawei, HiSilicon, "Motivation of New SI proposal: Evolving LTE with Flexible Duplex for Traffic Adaptation," 3GPP TSG RAN Meeting #63, Mar. 3-6, 2014, RP-140062.
(Continued)

*Primary Examiner* — Eunsook Choi
(74) *Attorney, Agent, or Firm* — Dentons US LLP

(57) ABSTRACT

The present invention relates to a wireless communication system. Particularly, the present invention relates to a method for transmitting control information and an apparatus therefor, the method comprising the steps of: generating a PUCCH for transmitting the control information; and transmitting the PUCCH from a subframe having a plurality of symbols, wherein the PUCCH is transmitted from an $M^{th}$ symbol (M>N) of the subframe when a downlink control channel is transmitted to first N (N>0) number of symbols of the subframe, and the PUCCH is transmitted from a first symbol of the subframe when the downlink control channel is not transmitted to the subframe.

14 Claims, 11 Drawing Sheets

(a)

(b)

(51) Int. Cl.
*H04W 74/00* (2009.01)
*H04L 1/18* (2006.01)
(52) U.S. Cl.
CPC ......... *H04W 72/042* (2013.01); *H04W 74/00* (2013.01); *H04L 1/1812* (2013.01)

(56) References Cited

U.S. PATENT DOCUMENTS

| | | | |
|---|---|---|---|
| 2013/0223301 A1* | 8/2013 | Lee | H04W 72/04 370/281 |
| 2013/0242824 A1 | 9/2013 | Lee et al. | |
| 2014/0334392 A1 | 11/2014 | Gage et al. | |
| 2015/0103703 A1* | 4/2015 | Zeng | H04W 72/14 370/280 |
| 2015/0109932 A1 | 4/2015 | Goldhamer | |
| 2015/0180622 A1 | 6/2015 | Yoo et al. | |
| 2016/0066276 A1* | 3/2016 | Su | H04J 3/1694 370/252 |

OTHER PUBLICATIONS

LG Electronics, China Telecom, Huawei, HiSilicon, IAESI, "Further discussion on regulatory aspects related to flexible duplex operation for E-UTRAN," 3GPP TSG RAN Meeting #67, Mar. 9-12, 2015, RP150250.
3GPP TR 36.882 V0.0.1, "3rd Generation Partnership Project; Technical Specification Group Radio Access Network; Evolved Universal Terrestrial Radio Access (E-UTRA); Study on regulatory aspects for flexible duplex for E-UTRAN (Release 13)," Jun. 30, 2015.

* cited by examiner

PUCCH format 1a and 1b structure (normal CP case)

PUCCH format 2,2a and 2b structure (normal CP case)

(a)

(b)

FIG. 15
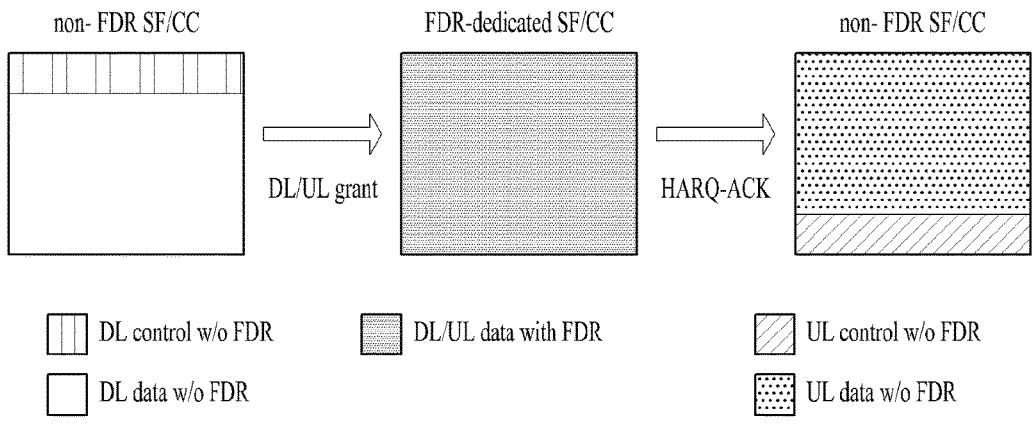
(a)
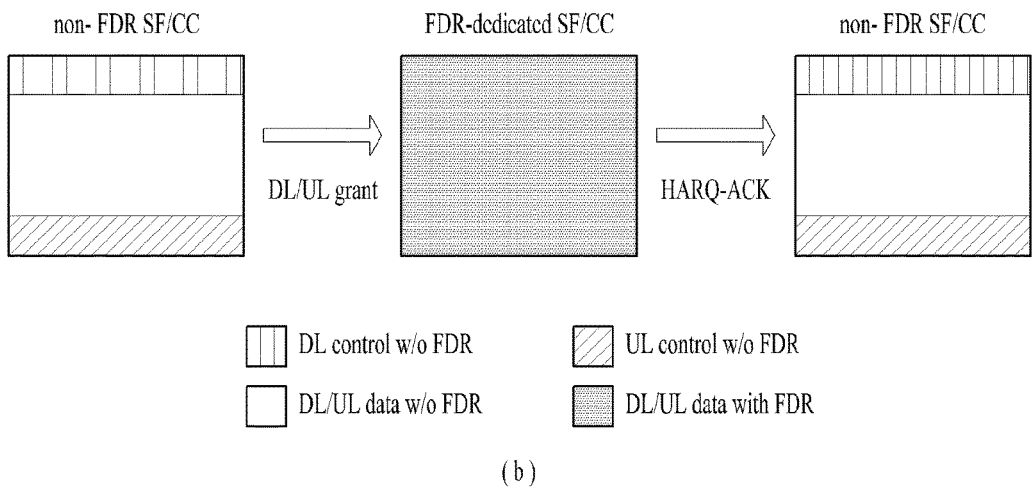
(b)
FIG. 16
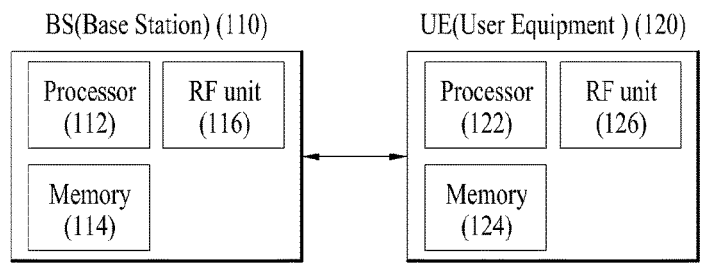

METHOD FOR TRANSMITTING AND RECEIVING WIRELESS SIGNAL AND APPARATUS THEREFOR

This application is a 35 USC § 371 National Stage entry of International Application No. PCT/KR2016/008911 filed on Aug. 12, 2016, and claims priority to U.S. Provisional Application Nos. 62/203,932 filed on Aug. 12, 2015 and 62/367,129 filed on Jul. 27, 2016, all of which are hereby incorporated by reference in their entireties as if fully set forth herein.

TECHNICAL FIELD

The present invention relates to a wireless communication system and, more specifically, to a method for transmitting radio signals and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention is to provide a method for efficiently transmitting/receiving wireless signals in a wireless communication system, and an apparatus therefor. Another object of the present invention is to provide a method for efficiently transmitting/receiving wireless signals and efficiently managing resources for wireless signal transmission/reception in a full duplex radio (FDR) system, and an apparatus therefor.

The technical problems solved by the present invention are not limited to the above technical problems and those skilled in the art may understand other technical problems from the following description.

Technical Solution

According to one aspect of the present invention, a method of transmitting control information by a UE in a wireless communication system includes: generating a PUCCH (Physical Uplink Control Channel) for transmitting the control information; and transmitting the PUCCH in a subframe having a plurality of symbols, wherein the PUCCH is transmitted from an M-th symbol (M>N) of the subframe when a downlink control channel is transmitted through first N (N>0) symbols of the subframe, and the PUCCH is transmitted from a first symbol of the subframe when the downlink control channel is not transmitted in the subframe.

According to another aspect of the present invention, a UE used in a wireless communication system includes: an RF (Radio Frequency) unit; and a processor, wherein the processor is configured to generate a PUCCH for transmitting control information and to transmit the PUCCH in a subframe having a plurality of symbols, and the PUCCH is transmitted from an M-th symbol (M>N) of the subframe when a downlink control channel is transmitted through first N (N>0) symbols of the subframe, and the PUCCH is transmitted from a first symbol of the subframe when the downlink control channel is not transmitted in the subframe.

Preferably, the subframe may include a plurality of slots, and when the downlink control channel is transmitted through the first N (N>0) symbols of the subframe, the length of an OCC (Orthogonal Cover Code) applied to the first slot of the PUCCH may be shorter than the length of an OCC applied to the second and following slots of the PUCCH.

Preferably, when the downlink control channel is transmitted through the first N (N>0) symbols of the subframe, the control information in the PUCCH may be rate-matched as many as M−1 symbols.

Preferably, the downlink control channel may include at least one of a PCFICH (Physical Control Format Indicator Channel), a PDCCH (Physical Downlink Control Channel) and a PHICH (Physical HARQ Indicator Channel).

Preferably, the downlink control channel may be transmitted through one or more OFDMA symbols, and the PUCCH may be transmitted through a plurality of SC-FDMA symbols.

Preferably, M may be N+1 or a previously designated specific value.

Preferably, the wireless communication system may be a 3GPP (3rd Generation Partnership Project)-based wireless communication system.

Advantageous Effects

According to the present invention, wireless signals can be efficiently transmitted and received. Specifically, wireless signals can be efficiently transmitted and received and resources therefor can be efficiently managed in an FDR system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIGS. 12 to 15 illustrate physical channels and resource configuration methods according to the present invention; and FIG. 16 illustrates a BS and a UE to which embodiments of the present invention are applicable.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
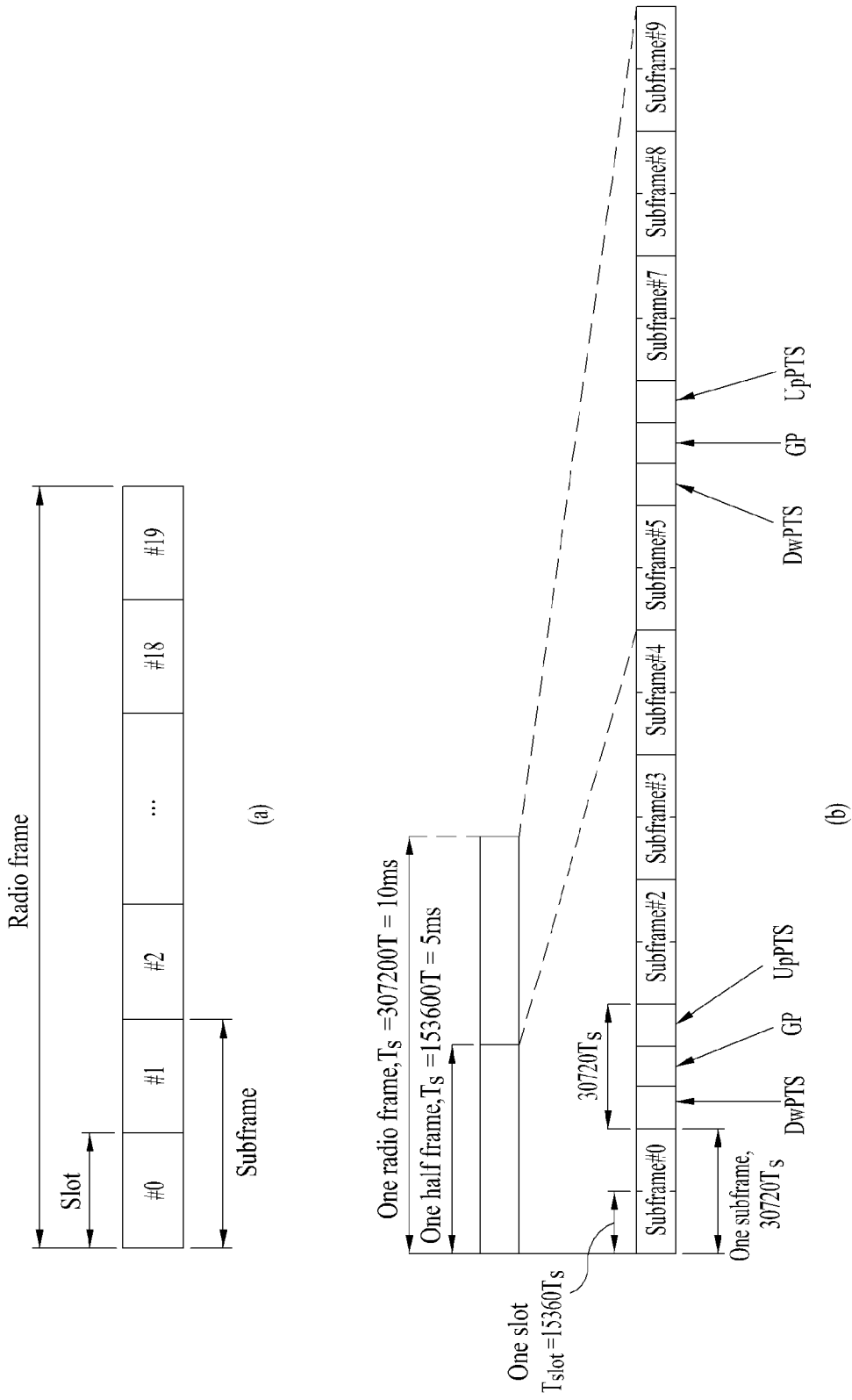
FIG. 1 illustrates a radio frame structure.

FIG. 1 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure applicable to FDD (Frequency Division Duplex) and a type-2 radio frame structure applicable to TDD (Time Division Duplex).

FIG. 1(a) illustrates the type-1 radio frame structure. A DL radio frame includes 10 subframes, each subframe including two slots in the time domain. A time required to transmit one subframe is defined as a transmission time interval (TTI). For example, one subframe may be 1 ms long and one slot may be 0.5 ms long. One slot includes a plurality of OFDM symbols in the time domain and a plurality of resource blocks (RBs) in the frequency domain. Since an LTE(-A) system uses OFDMA for DL, an OFDM symbol indicates one symbol period. The OFDM symbol may be called an SC-FDMA symbol or symbol period. An RB is a resource allocation unit including a plurality of contiguous subcarriers in one slot.

The number of OFDM symbols included in one slot may be changed according to configuration of a cyclic prefix (CP). For example, if each OFDM symbol is configured to include a normal CP, one slot may include 7 OFDM symbols. If each OFDM symbol is configured to include an extended CP, one slot may include 6 OFDM symbols.

FIG. 2(b) illustrates a type-2 radio frame structure. The type-2 radio frame includes 2 half frames. Each half frame includes 5 subframes each of which is composed of 2 slots.

Table 1 shows UL-DL configurations (UL-DL Cfgs) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes a DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows DwPTS/GP/UpPTS according to special subframe configuration. In Table 2, $T_s$ denotes sampling time.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE 2-continued

|  | Normal cyclic prefix in downlink | | | Extended cyclic prefix in downlink | | |
|---|---|---|---|---|---|---|
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The radio frame structure is merely exemplary and the number of subframes included in the radio frame, the number of slots included in a subframe, and the number of symbols included in a slot can vary.

Figure 2:
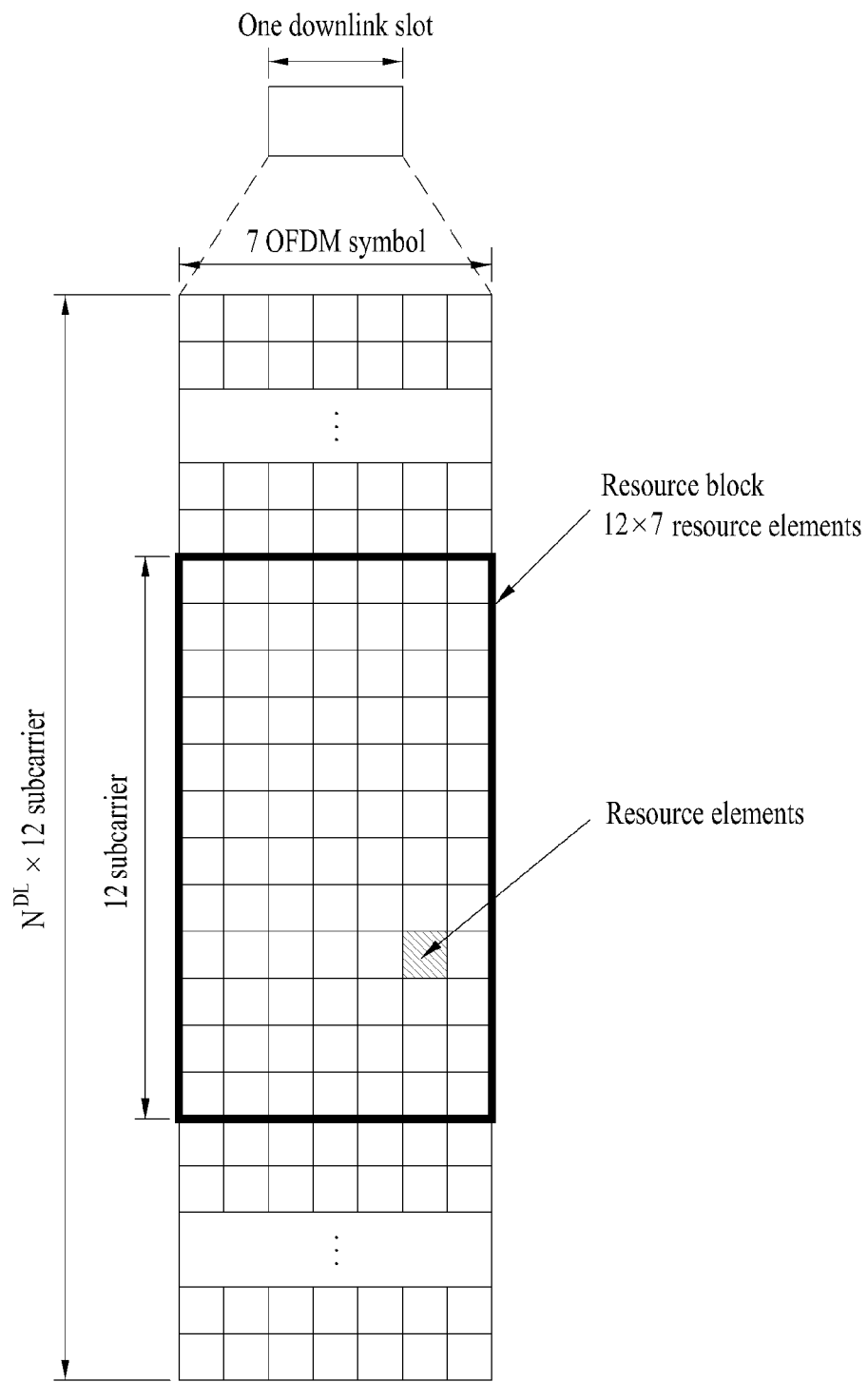
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7 (or 6) REs. The number $N_{RB}$ of RBs depends on a system bandwidth (BW). The structure of an uplink slot may be same as that of the downlink slot except that OFDM symbols by replaced by SC-FDMA symbols.

Figure 3:
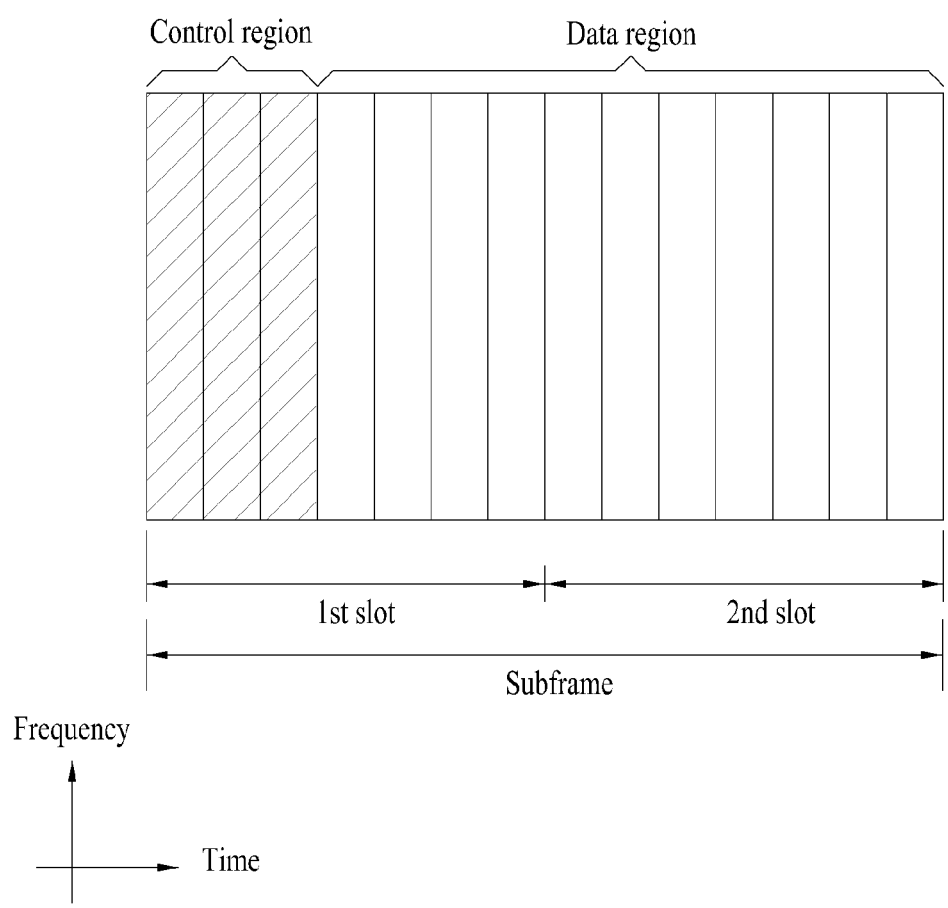
FIG. 3 illustrates a downlink subframe structure.

FIG. 3 illustrates a downlink subframe structure.

Referring to FIG. 3, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift for a DMRS (Demodulation Reference Signal), CQI (Channel Quality Information) request, HARQ process number, TPMI (Transmitted Precoding Matrix Indicator), PMI (Precoding Matrix Indicator) confirmation according as necessary.

The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. A UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. A BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, then an identifier (e.g., cell-RNTI (C-RNTI)) of the UE may be masked to the CRC. Alternatively, when the PDCCH is for a paging message, a paging identifier (e.g., paging-RNTI (P-RNTI)) may be masked to the CRC. When the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
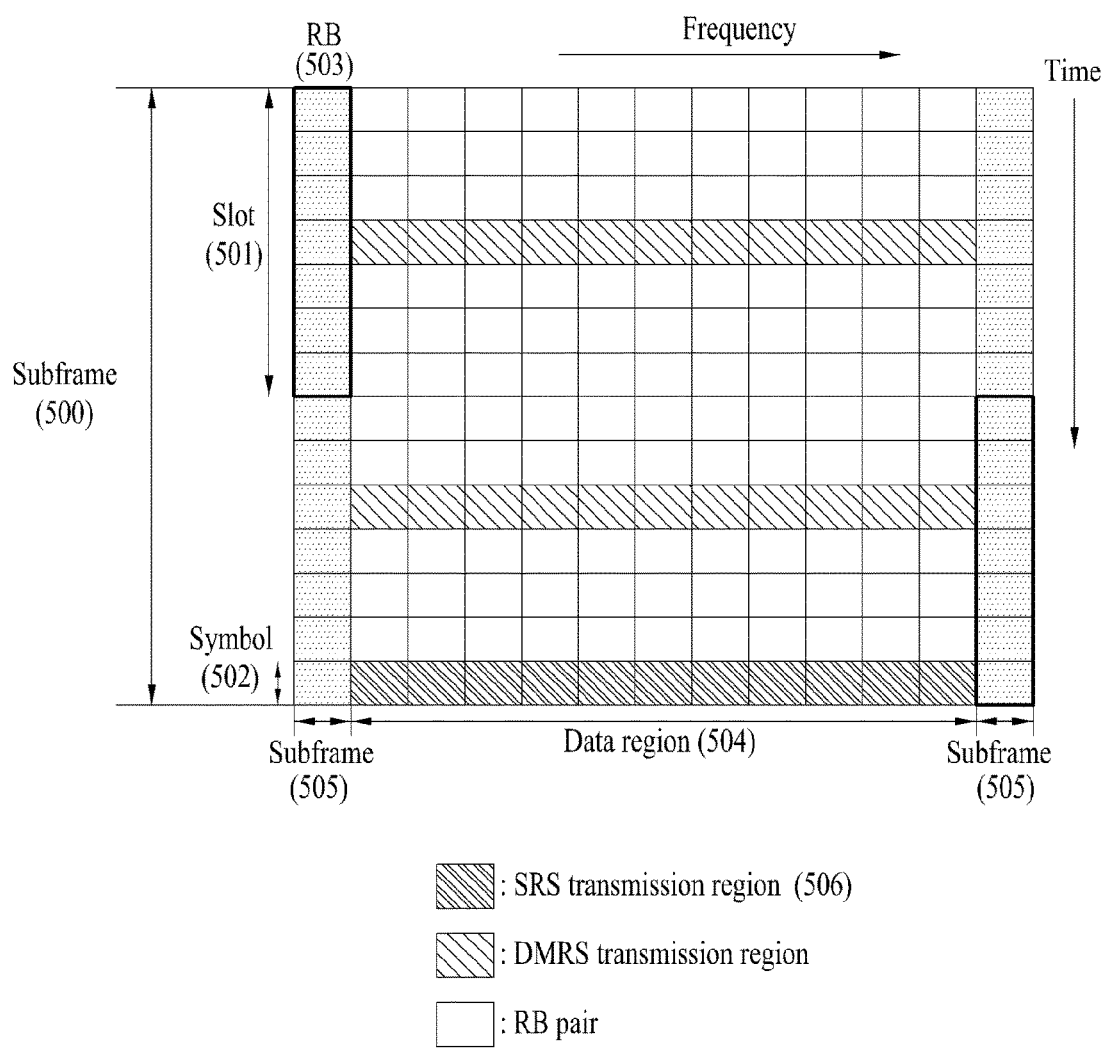
FIG. 4 illustrates an uplink subframe structure.

FIG. 4 illustrates an uplink subframe structure used in LTE.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit A/N signal is transmitted as a response to a single downlink codeword and a 2-bit A/N signal is transmitted as a response to two downlink codewords.

Channel Quality Indicator (CQI): This is feedback information about a downlink channel. MIMO (Multiple Input Multiple Output)-related feedback information includes a rank indicator (RI), a precoding matrix indicator (PMI) and a precoding type indicator (PTI). 20 bits per subframe are used.

Table 3 shows the mapping relationship between PUCCH formats and UCI in LTE.

TABLE 3

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

Figure 5:
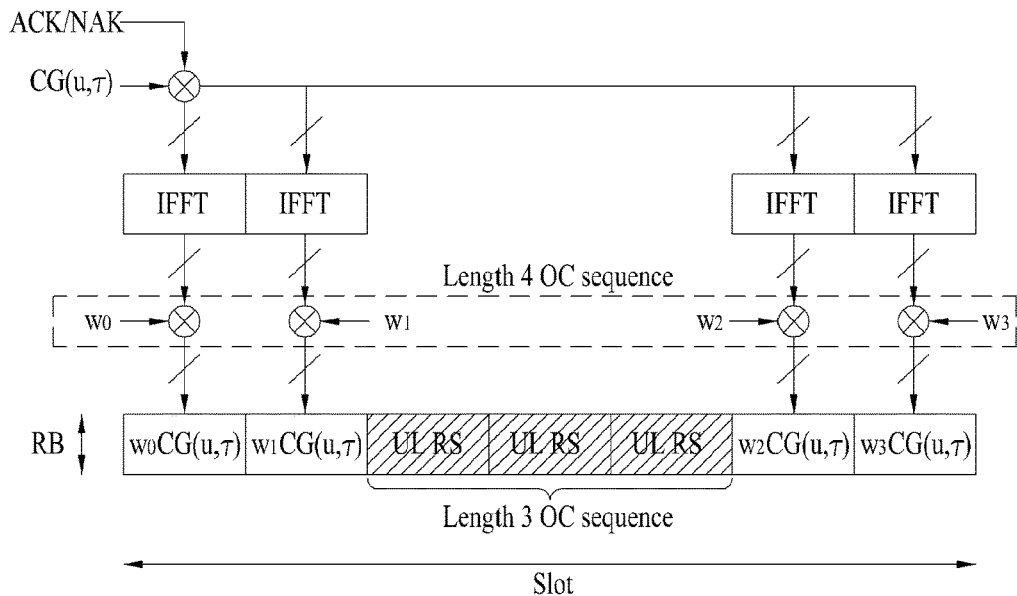
FIG. 5 illustrates a slot level structure of physical uplink control channel (PUCCH) format 1a/1b.

FIG. 5 illustrates a slot level structure of PUCCH format 1a/1b. PUCCH format 1a/1b is used for ACK/NACK transmission. In a normal CP, SC-FDMA #2/#3/#4 is used to transmit a DMRS. In an extended CP, SC-FDMA #2/#3 is used to transmit the DMRS. Therefore, 4 SC-FDMA symbols in a slot are used for ACK/NACK transmission. For convenience, PUCCH format 1a/1b is referred to as PUCCH format 1.

Referring to FIG. 5, 1-bit [b(0)] and 2-bit [b(0)b(1)] A/N information are modulated according to BPSK (binary phase shift keying) and QPSK (quadrature phase shift keying) modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). Table 4 shows a modulation table defined for PUCCH formats 1a and 1b in LTE.

TABLE 4

| PUCCH format | b(0), . . ., b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

In PUCCH format 1a/1b, cyclic shift (CS) ($\alpha_{cs,x}$) is performed in the frequency domain and spreading is performed using an orthogonal code (OC) (e.g. Walsh-Hadamard or DFT code) w0, w1, w2, w3 in the time domain. Since code multiplexing is used in both the frequency domain and the time domain, more UEs may be multiplexed in the same PUCCH RB.

Figure 6:
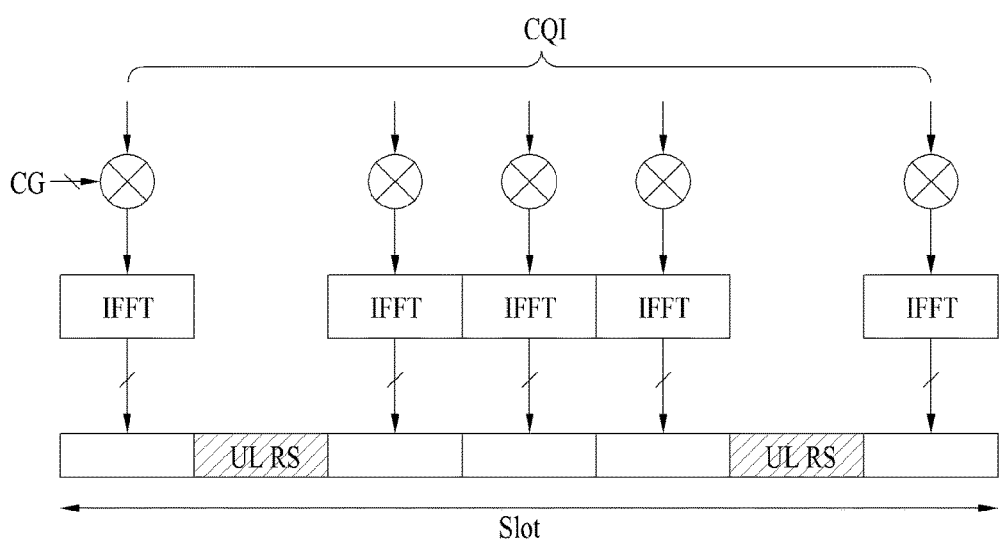
FIG. 6 illustrates a slot level structure of PUCCH format 2/2a/2b.

FIG. 6 illustrates PUCCH format 2/2a/2b. PUCCH format 2/2a/2b is used for CQI transmission. In a normal CP, one subframe includes 10 QPSK data symbols in addition to RS symbols. Each of the QPSK symbols is spread by a CS in the frequency domain and then mapped to a corresponding SC-FDMA symbol. CS hopping of an SC-FDMA symbol level may be applied for randomization of inter-cell interference. An RS may be multiplexed by CDM using a CS. For example, if the number of available CSs is 12 or 6, then 12 or 6 UEs may be multiplexed in the same PRB.

Figure 7:
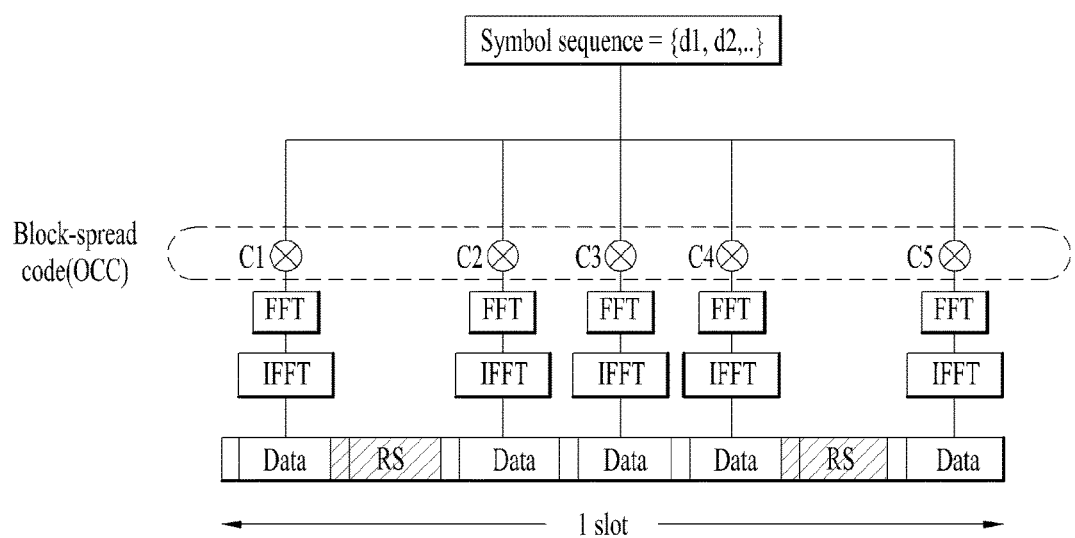
FIG. 7 illustrates a slot level structure of PUCCH format 3.

FIG. 7 illustrates the structure of PUCCH format 3 in a slot level. PUCCH format 3 is used to transmit a plurality of ACK/NACK information, and information such as CSI and/or SR may be transmitted together.

Referring to FIG. 7, one symbol sequence is transmitted over the frequency domain, and OCC-based time-domain spreading is applied to the symbol sequence. Control signals of a plurality of UEs may be multiplexed into the same RB using OCCs. Specifically, 5 SC-FDMA symbols (i.e. a UCI data part) are generated from one symbol sequence {d1, d2, . . . } using a length-5 OCC. Here, the symbol sequence {d1, d2, . . . } may be a modulation symbol sequence or a codeword bit sequence. The symbol sequence {d1, d2, . . . } may be generated by performing joint coding (e.g., Reed-Muller coding, tail-biting convolutional coding, etc.), block-spreading, and SC-FDMA modulation on a plurality of ACK/NACK information.

Figure 8:
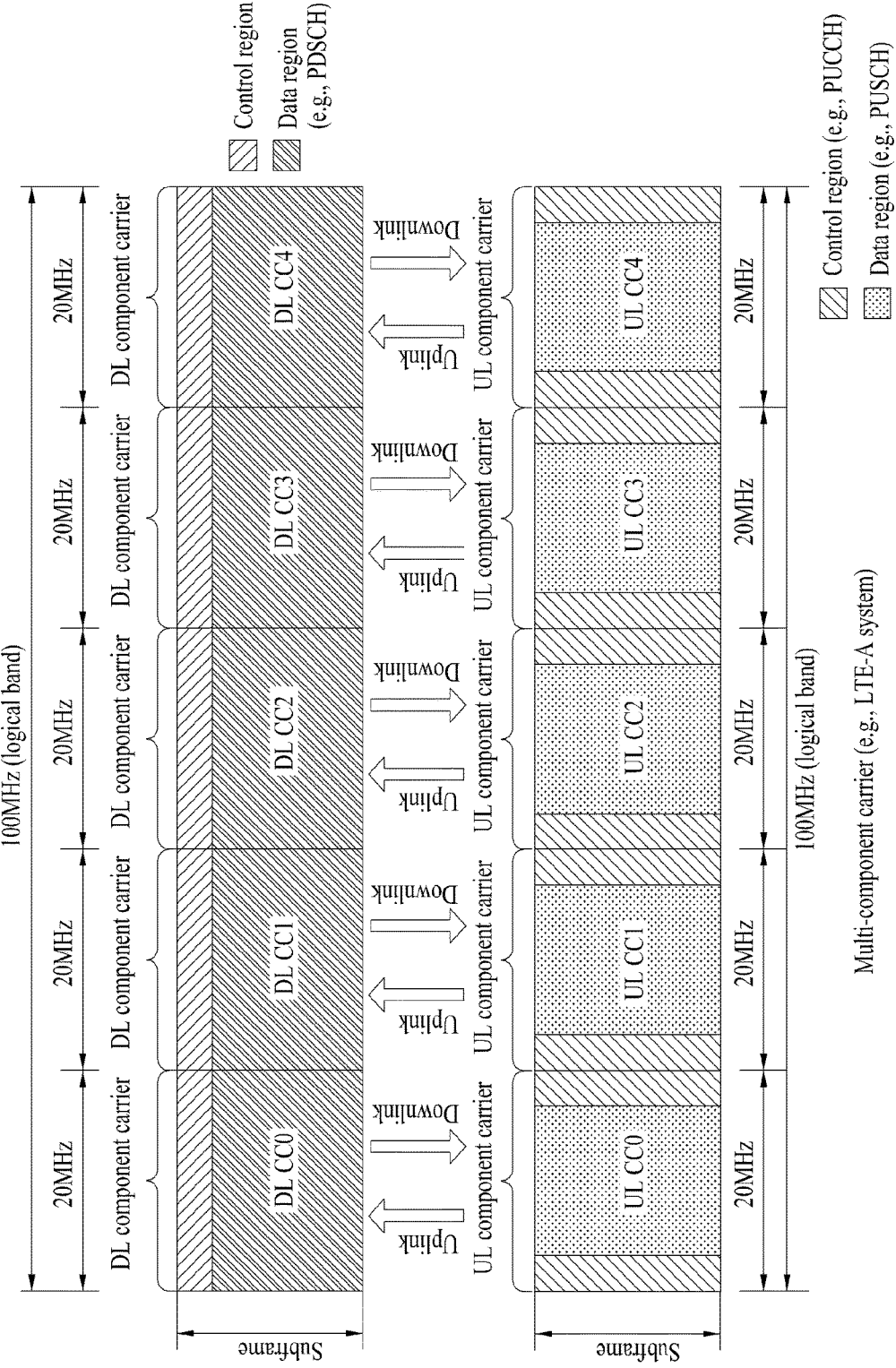
FIG. 8 illustrates a carrier aggregation (CA) communication system.

FIG. 8 illustrates a carrier aggregation (CA) communication system. LTE-A aggregates a plurality of UL/DL frequency blocks to support a wider UL/DL bandwidth in order to use a wider frequency band. Each frequency block is transmitted using a component carrier (CC). The CC may be regarded as a carrier frequency (or center carrier or a center frequency) for the corresponding frequency block.

Referring to FIG. 8, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC. This specific CC can be referred to as a primary CC (PCC) (or anchor CC) and other CCs can be referred to as secondary CCs (SCCs).

In LTE-A, the concept of a cell is used to manage radio resources [see, 36.300 V10.2.0 (2010-12) 5.5. Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information when carrier aggregation is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 9:
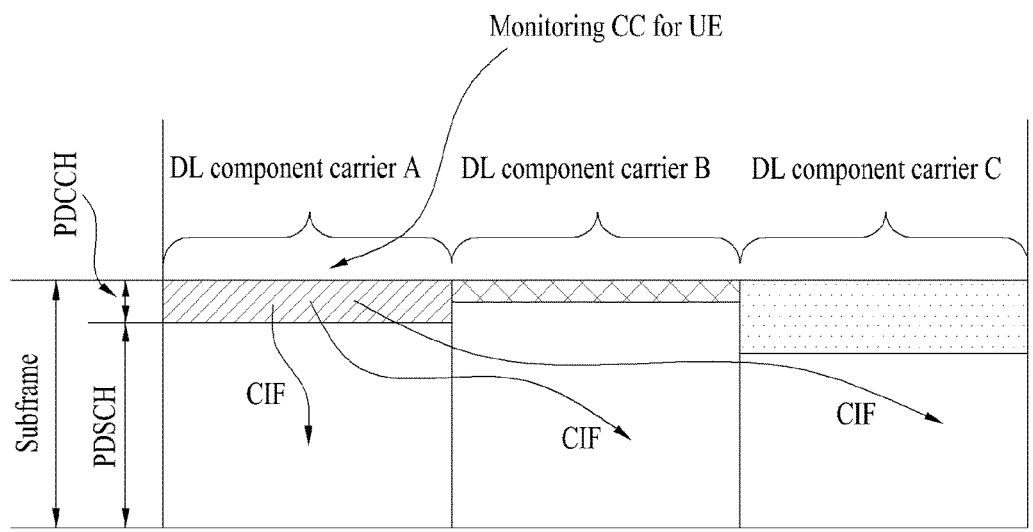
FIG. 9 illustrates scheduling when a plurality of carriers is aggregated.

FIG. 9 illustrates scheduling when a plurality of carriers is aggregated. It is assumed that 3 DL CCs are aggregated and DL CC A is set to a PDCCH monitoring DL CC in FIG. 9. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH rule. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, A PDCCH is not transmitted in DL CC B/C which is not set to a PDCCH monitoring DL CC.

Figure 10:
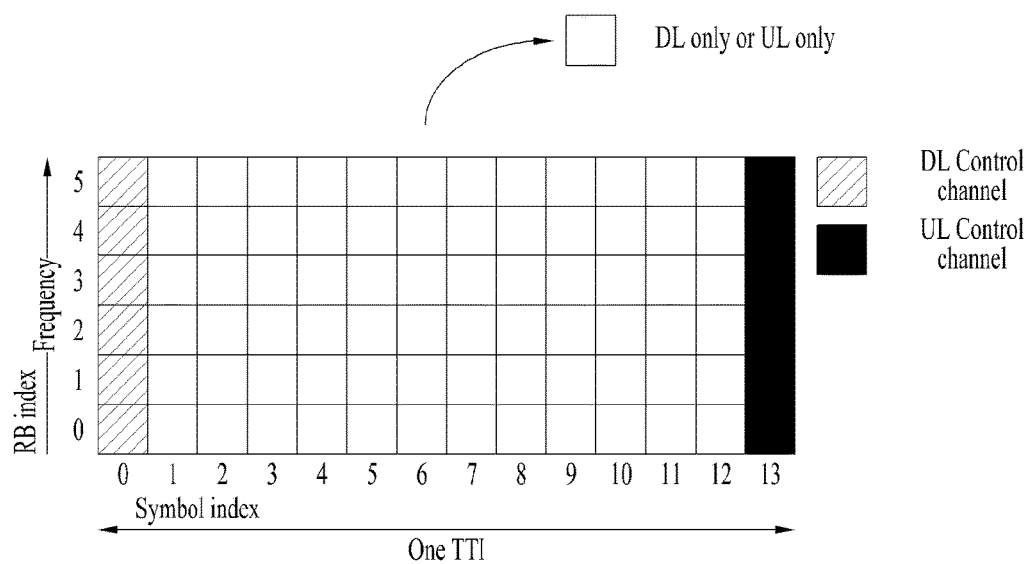
FIG. 10 illustrates a structure of a self-contained subframe.

In next-generation RAT (Radio Access Technology), a self-contained subframe is considered in order to minimize data transmission latency. FIG. 10 illustrates a self-contained subframe structure. In FIG. 10, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+UL control period

DL control period+DL data period

DL control period+GP+UL data period+UL control period

DL control period+GP+UL data period

A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Embodiment: Channel/Resource Allocation Structure for FDR

Figure 11:
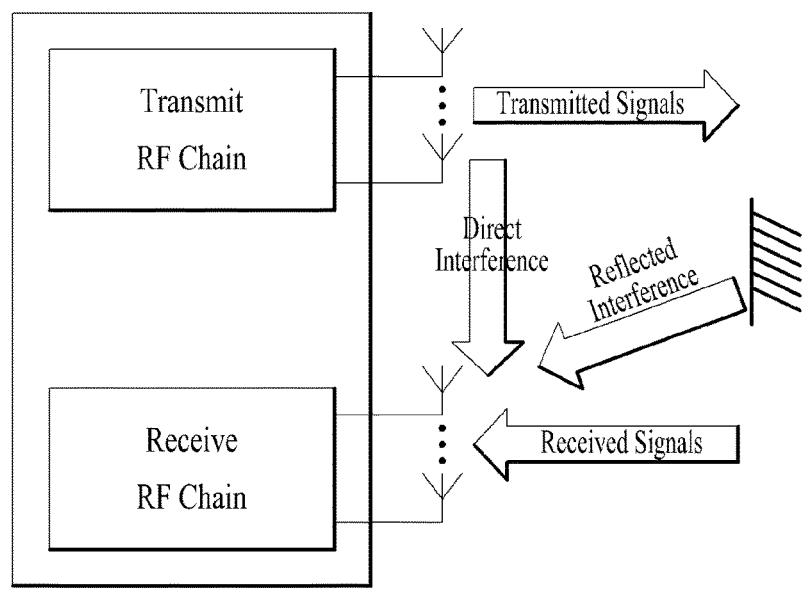
FIG. 11 illustrates the concept of transmission/reception links and self-interference (SI) in an FDR communication situation.

As an important candidate technology for systems following LTE-A, a full duplex radio (FDR) system which simultaneously performs signal transmission and reception operations through the same frequency band/resource is considered. FIG. 11 illustrates the concept of transmission/reception links and self-interference (SI) in an FDR communication situation. SI can be divided into direct interference wherein a signal transmitted from a transmit antenna of a device is directly input to a reception antenna of the device and reflected interference wherein a signal is reflected due to surrounding topography and has high inference strength. Accordingly, FUR devices (e.g., a BS and a UE) need to be able to remove/mitigate the influence of SI which is interference between transmitted and received signals thereof in order to perform FDR operation. Specifically, a BS can perform the FUR operation in a manner of removing/mitigating interference from a DL transmission signal when a UL signal is received and a UE can perform the FUR operation in a manner of removing/mitigating interference from a UL transmission signal when a DL signal is received.

In the case of a PDCCH carrying DCI which is DL control information in legacy LTE-A, a PDCCH for a plurality of UEs is multiplexed to RE/REG (Resource Element/Resource Element Group) levels over the entire system BW (bandwidth) (in the same frequency band). In the case of a PUCCH carrying UCI which is UL control information, PUCCHs from a plurality of UEs are multiplexed using different CSs/OCCs (Cyclic Shifts/Orthogonal Cover Codes) (in the same frequency resources located) at the edge of the system BW. In the case of a PDSCH carrying DL data and a PUSCH carrying UL data, a PDSCH/PUSCH for a plurality of UEs is multiplexed to different frequency bands/resources in units of PRB using FDM.

The FDR system can eliminate or mitigate the influence of SI but may have difficulty in effectively suppressing/alleviating UE-to-UE interference (e.g., interference caused by a UL transmission signal from a UE when a DL signal of another specific UE is received) which is interference between transmitted and received signals of different UEs. Considering FDR operation based on LTE-A, in the case of PDSCH/PUSCH, the influence of UE-to-UE interference can be prevented through FDM between UEs, and even when interference is present, the FDR operation can be performed because HARQ retransmission is possible. On the contrary, in the case of PDCCH/PUCCH, multiple UEs are multiplexed to the same frequency band/resource, and thus the influence of UE-to-UE interference cannot be avoided, and if the multiple UEs include a non-FDR UE which does not perform the FDR operation (e.g., a UE which performs only one of DL reception and UL transmission operations), performance deterioration due to interference may be aggravated.

The present invention proposes FDR system structures and operating methods for providing stable control information signaling. Proposed schemes can be divided into 1) a structure in which a control channel and a data channel are transmitted through the same subframe (SF)/component carrier (CC) and 2) a structure in which a control channel and a data channel are transmitted through different SFs/CCs.

(1) Approach 1: Same-SF/CC Based FDR Structure

In this approach, DL/UL control channels and DL/UL data channels are simultaneously transmitted through the same SF on the same CC, FDR transmission is applied to/performed on DL/UL data channels only, and non-FDR transmission is applied to/performed on DL/UL control channels by default. Specifically, DL reception and UL transmission can be simultaneously performed (in the FDR manner) in a resource region to which DL/UL data channels are allocated, whereas only DL reception operation can be performed in a resource region to which a DL control channel is allocated and only UL transmission operation can be performed in a resource region to which a UL control channel is allocated (in the non-FDR manner). Alternatively, in a state in which a resource region in which the FDR operation is performed (referred to as an FDR region) and a resource region in which the non-FDR operation is performed (referred to as a non-FDR region) are set in advance, DL/UL data channels can be simultaneously transmitted and received through an FDR region, whereas a DL control channel can be received or transmitted only through a DL non-FDR region and a UL control channel can be received or transmitted only through a UL non-FDR region.

In addition, transmission through the same method as that used for DL control channels (e.g., a method of applying/performing non-FDR DL reception operation) may also be performed for synchronization signals, system information, a TRS (Tracking Reference Signal) for DL synchronization tracking, a CSI-RS (Channel State Information-Reference Signal) for CSI measurement, an RRM (Radio Resource Management)-RS for RRM measurement, etc. Furthermore, transmission through the same method as that used for UL control channels (e.g., a method of applying/performing non-FDR UL transmission operation) may also be performed for a random access signal (e.g., RACH preamble), contention based UL transmission resources, UL control channels including an SR, UL control channels including periodic CSI, a periodic SRS (Sounding Reference Signal) for UL radio channel sounding, etc.

When Approach 1 is applied to LTE-A, the following (control/data) channels and (non-FDR/FDR) resource configuration schemes can be considered.

(a) Alt 1-1: PDCCH over entire system BW, short PUCCH with non-PDCCH symbol

Figure 12:
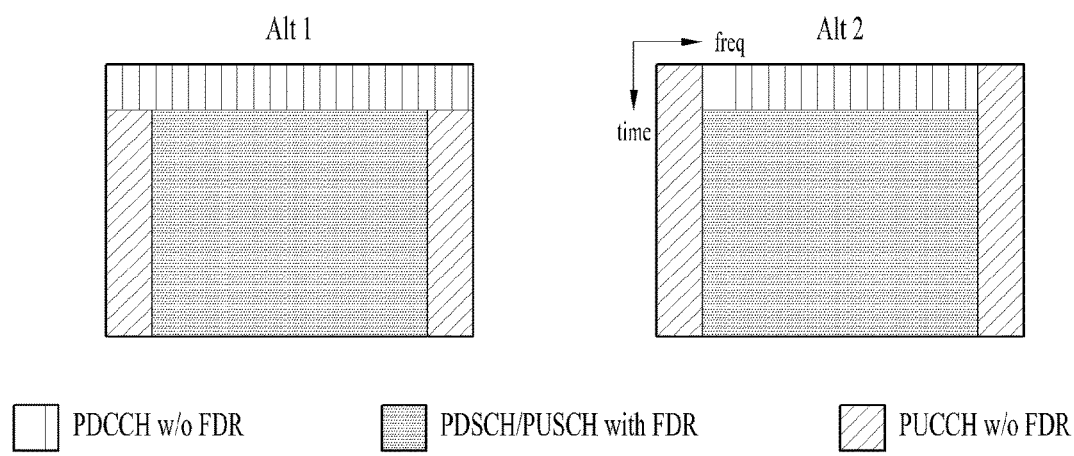

In this method, a PDCCH is configured/transmitted over the entire system BS (with non-FDR) as in the legacy system, whereas a PUCCH may be configured/transmitted (with non-FDR) using only symbols other than (OFDM or SC-FDMA) symbols configured for a PDCCH (refer to Alt1 of FIG. 12). For example, when a DL control channel (e.g., a PDCCH) is transmitted through first N (N>0) symbols of a subframe, a PUCCH can be transmitted from an M-th (M>N) symbol of the subframe. N is an integer equal to or greater than 1 and M is an integer greater than N. M may be N+1. In this case, a UE can be aware of N through a PCFICH. M may be a specific value previously designated by a higher layer (e.g., radio resource control (RRC)) in consideration of a PCFICH detection time. When a DL control channel is transmitted in the starting part of a subframe, the length of an orthogonal cover code (OCC) applied to the first slot may be set to be shorter than the length of an OCC applied to the second and following slots in the case of PUCCH format 1/3. For example, in the case of PUCCH format 1, an OCC having a length of 2 or 3 can be applied to the first slot and an OCC having a length of 4 can be applied to the second slot. Accordingly, a PUCCH is not transmitted in the first and second symbols of the first slot and the PUCCH can be normally transmitted in the second slot (refer to FIG. 5). In the case of PUCCH format 2, control information can be rate-matched (or punctured) as many as M−1 symbols in consideration of the number (e.g., N) of PDCCH transmission symbols or the position of the PUCCH start symbol. When there is no DL control channel in the starting part of a subframe (non-FDR), the PUCCH may be normally transmitted from the first symbol of a subframe (refer to FIGS. 4 to 7).

Meanwhile, a PDSCH/PUSCH may be transmitted and received (with FDR) through resource regions other than resources configured for a PDCCH/PUCCH. In this case, a PDSCH transmission band is reduced by a PUCCH transmission band. Accordingly, DL RBs can be newly indexed on the basis of available PDSCH transmission bands in an FDR situation. In this case, the size of resource allocation information in a PDCCH which schedules a PDSCH may be determined on the basis of the available PDSCH transmission bands. In a non-FDR situation, DL RBs are indexes on the basis of the entire DL band and the size of resource allocation information in the PDCCH which schedules the PDSCH is determined on the basis of the entire DL band. Accordingly, a UE can differently assume a PDCCH payload size in a PDCCH detection process and differently interpret physical resources indicated by resource allocation information depending on whether FDR is applied (e.g., depending on presence or absence of a DL control channel in the starting part of a subframe). A PUSCH may be configured using only symbols other than symbols configured for a PDCCH. To this end, the PUSCH can also be rate-matched (or punctured) as many as N or M−1 symbols. When there is no DL control channel in the starting part of a subframe (non-FDR), the PUSCH can be normally transmitted from the first symbol of a subframe (refer to FIG. 4).

(b) Alt 1-2: PUCCH over all symbols in SF, narrow PDCCH with non-PUCCH PRB

In this method, a PUCCH is configured/transmitted over all symbols in an SF (with non-FDR) as in the legacy system, wherein a PDCCH may be configured/transmitted (with non-FDR) using only PRB resource regions other than frequency bands set for the PUCCH (refer to Alt 2 of FIG. 12). To this end, a frequency band in which the PDCCH is dispersed may be set differently depending on whether FDR is applied. That is, the PDCCH is dispersed in the entire system bandwidth in a non-FDR situation, whereas the PDCCH is dispersed only in (the entire system bandwidth—PUCCH transmission band) in an FDR situation. Accordingly, a UE can differently set a frequency band in which the PDCCH is dispersed depending on whether FDR is applied (e.g., depending on presence or absence of a DL control channel in the starting part of a subframe) and thus can attempt to detect DL control channels (e.g., a PCFICH, a PDCCH and a PHICH).

A PDSCH/PUSCH can be transmitted and received (with FDR) through resource regions other than resources configured for the PDCCH/PUCCH. In this case, a PDSCH transmission band is reduced by a PUCCH transmission band. Accordingly, DL RBs can be newly indexed on the basis of available PDSCH transmission bands in an FDR situation. In this case, the size of resource allocation information in a PDCCH which schedules a PDSCH can also be determined on the basis of the available PDSCH transmission bands. In a non-FDR situation, DL RBs are indexed on the basis of the entire DL band and the size of resource allocation information in the PDCCH which schedules the PDSCH is also determined on the basis of the entire DL band. Accordingly, a UE can differently assume a PDCCH payload size in a PDCCH detection process and differently interpret physical resources indicated by resource allocation information depending on whether FDR is applied (e.g., depending on presence or absence of a DL control channel in the starting part of a subframe). Further, a PUSCH may be configured using only symbols other than symbols configured for a PDCCH. To this end, the PUSCH can also be rate-matched (or punctured) as many as N or M−1 symbols. When there is no DL control channel in the starting part of a subframe (non-FDR), the PUSCH can be normally transmitted from the first symbol of a subframe (refer to FIG. 4).

Figure 13:
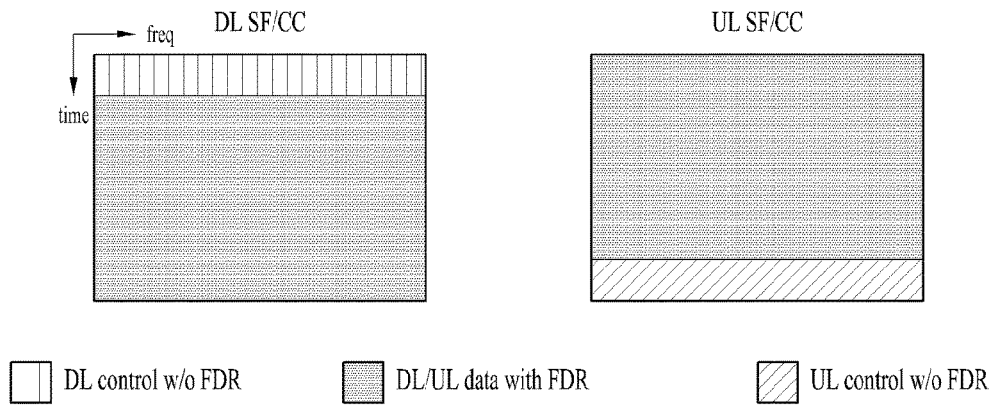

Meanwhile, when Approach 2 is applied to the frame structure (e.g. self-contained SF) considered in the next-generation RAT system, FDR/non-FDR resources may be configured in the form of FIG. 13(a) (in the case of FDD) or FIG. 13(b) (in the case of TDD).

(2) Approach 2: Cross-SF/CC Based FDR Structure

In this method, a DL/UL control channel and a DL/UL data channel are respectively transmitted through different SFs and/or different CCs, FDR transmission is applied to/performed on DL/UL data channels only and non-FDR transmission is applied to/performed on DL/UL control channels by default. Specifically, DL reception and UL transmission can be simultaneously performed (with FDR) in SFs/CCs to which DL/UL data channels are allocated, whereas only DL reception operation can be performed in SFs/CCs to which a DL control channel is allocated and only UL transmission operation can be performed in SFs/CCs to which a UL control channel is allocated (with non-FDR). Alternatively, in a state in which SFs/CCs in which the FDR operation is performed (referred to as FDR-dedicated SFs/CCs region) and SFs/CCs in which the non-FDR operation is performed (i.e., non-FDR SFs/CCs) are set in advance, DL/UL data channels can be simultaneously transmitted and received through FDR-dedicated SFs/CCs, whereas a DL control channel can be received or transmitted only through DL non-FDR SFs/CCs and a UL control channel can be received or transmitted only through UL non-FDR SFs/CCs.

In addition, transmission through the same method as that used for DL control channels (e.g., a method of applying/performing non-FDR DL reception operation) may also be performed for synchronization signals, system information, a TRS (Tracking Reference Signal) for DL synchronization tracking, a CSI-RS (Channel State Information-Reference Signal) for CSI measurement, an RRM (Radio Resource Management)-Rs for RRM measurement, etc. Furthermore, transmission through the same method as that used for UL control channels (e.g., a method of applying/performing non-FDR UL transmission operation) may also be performed for a random access signal (e.g., RACH preamble), contention based UL transmission resources, UL control channels including an SR, UL control channels including periodic CSI, a periodic SRS (Sounding Reference Signal) for UL radio channel sounding, etc.

When Approach 2 is applied to LTE-A, the following (control/data) channels and (non-FDR/FDR) resource configuration schemes can be considered.

(a) Alt 2-1: FUR-dedicated SF is scheduled and controlled by non-FDR SF

Figure 14:
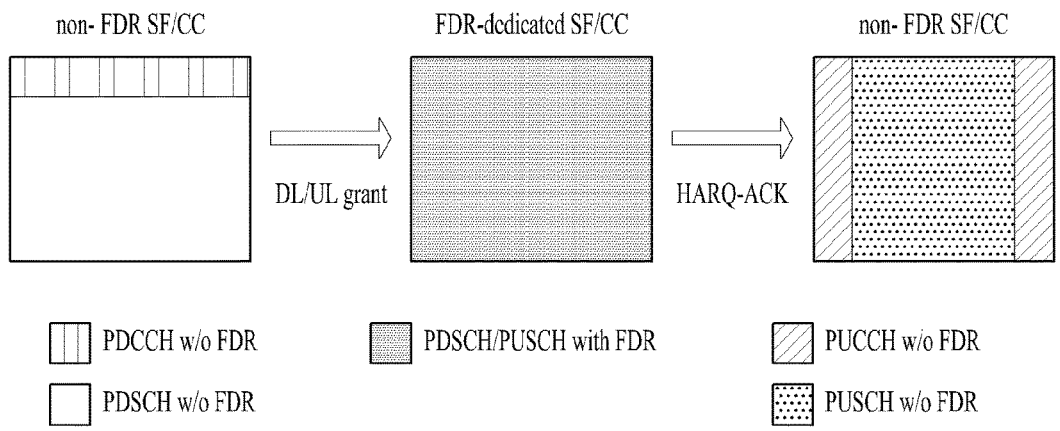

According to this method, PDSCH/PUSCH transmission in an FDR-dedicated SF is scheduled/controlled by a non-FDR SF. Specifically, a DL/UL grant signal (e.g., a PDCCH) which schedules PDSCH/PUSCH transmission in an FDR-dedicated SF and a DL/UL HARQ-ACK feedback (e.g., a PUCCH/PHICH) corresponding to the PDSCH/PUSCH may be transmitted through non-FDR SFs. The PDSCH/PUSCH may be configured/transmitted over all symbols in the FUR-dedicated SF (refer to FIG. 14). The FDR-dedicated SF may be configured in the structure of Approach 1. Further, the MBSFN (Multicast Broadcast Single Frequency Network) SF may be used as the FDR-dedicated SF. Since legacy UEs use only a control region in the MBSFN SF, FDR can be performed using a data region (refer to FIG. 3). In this case, the FDR-dedicated SF may have a structure similar to Approach 1. The MBSFN SF is indicated using a bitmap indicating a subframe pattern and the subframe pattern is repeated.

(b) Alt 2-2: FDR-dedicated CC is scheduled and controlled by non-FDR CC

According to this method, PDSCH/PUSCH transmission in an FDR-dedicated CC is scheduled/controlled by a non-FDR CC. Specifically, a DL/UL grant signal (e.g., a PDCCH) which schedules PDSCH/PUSCH transmission in an FDR-dedicated CC and a DL/UL HARQ-ACK feedback (e.g., a PUCCH/PHICH) corresponding to the PDSCH/PUSCH may be transmitted through non-FDR CCs. A PDSCH/PUSCH allocated to an FUR-dedicated CC may be configured/transmitted over all symbols in one SF (refer to FIG. 14). In addition, an SF on an FDR-dedicated CC may be configured in the structure of Approach 1.

Meanwhile, when Approach 2 is applied to the frame structure (e.g. self-contained SF) considered in the next-generation RAT system, FDR/non-FDR resources may be configured in the form of FIG. 15(a) (in the case of FDD) or FIG. 15(b) (in the case of TDD).

In the above description and drawings, non-FDR resources (e.g., w/o FDR) may refer to (dedicated) DL resources configured for UEs for DL control channel reception or (dedicated) UL resources configured for UL control channel transmission. In contrast, FDR resources (e.g., with FDR) may refer to (shared) resources configured for simultaneous transmission and reception of a DL data channel and a UL data channel (as well as DL data channel reception or UL data channel transmission).

Additionally, the following operation may be performed for the purpose of ensuring reliability with respect to reception/demodulation of control/data channels, measurement of radio channel states, maintaining time/frequency synchronization (e.g., tracking), system information reception (e.g., SI acquisition) and the like (to avoid the influence of self-interference and/or UE-to-UE interference due to FDR), which is similar to the purpose of control signaling protection in the above-described proposition. First, when DL control/data channels (e.g., PDCCH/PDSCH) are received, rate-matching (or puncturing) may be applied to resources (REs or SC-FDMA symbols including the same) through which an RS (e.g., a UL DMRS) used for reception/demodulation of UL control/data channel (e.g., PUCCH/PUSCH) and/or an RS (e.g., an SRS) used for UL radio channel estimation are transmitted. In addition, when UL control/data channels (e.g., PUCCH/PUSCH) are transmitted, rate-matching (or puncturing) may be applied to resources (REs or OFDM symbols including the same) through which an RS (e.g., a DL DMRS/CRS (cell-specific RS)) used for reception/demodulation of DL control/data channels (e.g., PDCCH/PDSCH), an RS (e.g., a CRS/CSI-RS) used for DL radio channel estimation, a synchronization signal (e.g., a PSS/SSS) and/or a broadcast signal (e.g., a PBCH) carrying system information are transmitted.

FIG. 16 illustrates a BS and a UE to which embodiments of the present invention are applicable. When a wireless communication system includes a relay, the BS or the UE can be replaced by the relay.

Referring to FIG. 16, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for wireless communication apparatuses such as a UE, a relay, a BS, etc.

The invention claimed is:

1. A method of transmitting control information by a User Equipment (UE) in a wireless communication system, comprising:
generating a Physical Uplink Control Channel (PUCCH) for transmitting the control information; and
transmitting the PUCCH in a subframe having a plurality of symbols,
wherein the PUCCH is transmitted from an M-th symbol (M>N) of the subframe when a downlink control channel is transmitted through first N (N>0) symbols of the subframe, and the PUCCH is transmitted from a first symbol of the subframe when the downlink control channel is not transmitted in the subframe.

2. The method according to claim 1, wherein the subframe includes a plurality of slots, and when the downlink control channel is transmitted through the first N (N>0) symbols of the subframe, the length of an Orthogonal Cover Code (OCC) applied to the first slot of the PUCCH is shorter than the length of an OCC applied to the second and following slots of the PUCCH.

3. The method according to claim 1, wherein, when the downlink control channel is transmitted through the first N (N>0) symbols of the subframe, the control information in the PUCCH is rate-matched as many as M−1 symbols.

4. The method according to claim 1, wherein the downlink control channel includes at least one of a Physical Control Format Indicator Channel (PCFICH), a Physical Downlink Control Channel (PDCCH) and a Physical HARQ Indicator Channel (PHICH).

5. The method according to claim 1, wherein the downlink control channel is transmitted through one or more Orthogonal Frequency Division Multiple Access (OFDMA) symbols, and the PUCCH is transmitted through a plurality of Single Carrier Frequency Division Multiple Access (SC-FDMA) symbols.

6. The method according to claim 1, wherein M is N+1 or a previously designated specific value.

7. The method according to claim 1, wherein the wireless communication system is a 3rd Generation Partnership Project (3GPP)-based wireless communication system.

8. A User Equipment (UE) used in a wireless communication system, comprising:
an Radio Frequency (RF) unit; and
a processor,
wherein the processor is configured to generate a Physical Uplink Control Channel (PUCCH) for transmitting control information and to transmit the PUCCH in a subframe having a plurality of symbols, and wherein the PUCCH is transmitted from an M-th symbol (M>N) of the subframe when a downlink control channel is transmitted through first N (N>0) symbols of the subframe, and the PUCCH is transmitted from a first symbol of the subframe when the downlink control channel is not transmitted in the subframe.

9. The UE according to claim 8, wherein the subframe includes a plurality of slots, and when the downlink control channel is transmitted through the first N (N>0) symbols of the subframe, the length of an Orthogonal Cover Code (OCC) applied to the first slot of the PUCCH is shorter than the length of an OCC applied to the second and following slots of the PUCCH.

10. The UE according to claim 8, wherein, when the downlink control channel is transmitted through the first N (N>0) symbols of the subframe, the control information in the PUCCH is rate-matched as many as M−1 symbols.

11. The UE according to claim 8, wherein the downlink control channel includes at least one of a Physical Control Format Indicator Channel (PCFICH), a Physical Downlink Control Channel (PDCCH) and a Physical HARQ Indicator Channel (PHICH).

12. The UE according to claim 8, wherein the downlink control channel is transmitted through one or more Orthogonal Frequency Division Multiple Access (OFDMA) symbols, and the PUCCH is transmitted through a plurality of Single Carrier Frequency Division Multiple Access (SC-FDMA) symbols.

13. The UE according to claim 8, wherein M is N+1 or a previously designated specific value.

14. The UE according to claim 8, wherein the wireless communication system is a 3rd Generation Partnership Project (3GPP)-based wireless communication system.

* * * * *